(12) United States Patent
Fritjofsson et al.

(10) Patent No.: US 8,752,413 B2
(45) Date of Patent: Jun. 17, 2014

(54) TEST PRESSURISATION DEVICE FOR HOSE

(75) Inventors: Per-Arne Fritjofsson, Uppsala (SE);
Anders Ahlén, Knivsta (SE)

(73) Assignee: Allgotech AB, Uppsala (SE)

( * ) Notice: Subject to any disclaimer, the term of this patent is extended or adjusted under 35 U.S.C. 154(b) by 78 days.

(21) Appl. No.: 13/509,095

(22) PCT Filed: Dec. 17, 2010

(86) PCT No.: PCT/SE2010/051410
§ 371 (c)(1),
(2), (4) Date: May 10, 2012

(87) PCT Pub. No.: WO2011/084096
PCT Pub. Date: Jul. 14, 2011

(65) Prior Publication Data
US 2012/0291525 A1    Nov. 22, 2012

(30) Foreign Application Priority Data
Jan. 7, 2010 (SE) ........................ 1050003

(51) Int. Cl.
*G01M 3/00* (2006.01)
*A62C 33/00* (2006.01)

(52) U.S. Cl.
USPC ............................................... 73/40

(58) Field of Classification Search
None
See application file for complete search history.

(56) References Cited

U.S. PATENT DOCUMENTS

| 3,299,417 A | 1/1967 | Sibthorpe |
| 3,721,898 A | 3/1973 | Dragoumis et al. |
| 3,756,072 A | 9/1973 | MacMurray |
| 4,576,037 A | 3/1986 | Cox |

(Continued)

FOREIGN PATENT DOCUMENTS

| DE | 102 56 696 | 12/2002 |
| DE | 101 29 481 | 1/2003 |

(Continued)

OTHER PUBLICATIONS

English translation of DE 102007012147 A1.*

(Continued)

*Primary Examiner* — Daniel S Larkin
*Assistant Examiner* — Irving A Campbell
(74) *Attorney, Agent, or Firm* — Nixon & Vanderhye P.C.

(57) ABSTRACT

A test pressurization device (100) for hose (1) includes a first pair of press/driving rolls (10, 12) between which the hose can be inserted, and a second pair of press/driving rolls (20, 22) between which the hose can be inserted. The first pair of press/driving rolls (10, 12) is arranged on a distance from the second pair of press/driving rolls (20, 22). Further each pair of press/driving rolls is arranged for pressing the hose together between the rolls in conjunction with pressurization with a medium such as water so that a limited part of the hose, which is located between the first and the second pair of press/driving rolls, can be held pressurized and control of the hoses or its couplings tightness is admitted. Furthermore, while sections of the hose are held pressurized between the pairs of press/driving rolls, the same pairs of press/driving rolls are feeding the hose forward, thus checking the hoses tightness in a continuously moving section approach. In this way a very space efficient solution is achieved, as only a limited part of the hose needs to be held pressurized at a time.

18 Claims, 7 Drawing Sheets

(56) References Cited

U.S. PATENT DOCUMENTS

| | | | |
|---|---|---|---|
| 4,649,948 A | 3/1987 | Hudson | |
| 6,330,483 B1 * | 12/2001 | Dailey | 700/28 |
| 6,351,985 B1 | 3/2002 | Bedwell | |
| 8,176,771 B2 | 5/2012 | Onishi et al. | |
| 2003/0200877 A1 * | 10/2003 | Blei | 100/214 |
| 2003/0201211 A1 * | 10/2003 | Bennett et al. | 209/586 |
| 2005/0166666 A1 | 8/2005 | Tsukagoshi | |
| 2008/0201974 A1 | 8/2008 | Kato | |
| 2009/0248324 A1 | 10/2009 | Hamilton et al. | |

FOREIGN PATENT DOCUMENTS

| | | | |
|---|---|---|---|
| DE | 20 2005 008 846 | | 9/2005 |
| DE | 198 16 105 | | 11/2006 |
| DE | 199 16 976 | | 2/2008 |
| DE | 102007012147 A1 * | 9/2008 | G01M 3/00 |
| EP | 0 677 728 | | 10/1995 |
| JP | 02122233 A | | 5/1990 |
| SE | 528 582 C2 | | 12/2006 |
| WO | WO 2008110150 | | 9/2008 |
| WO | WO 2011006867 | | 1/2011 |

OTHER PUBLICATIONS

International Search Report for PCT/SE2010/051410, mailed Mar. 17, 2011.
International Search Report mailed Jan. 20, 2011 in Application No. PCT/SE2010/051072.
Office Action mailed Nov. 6, 2013 in co-pending U.S. Appl. No. 13/500,489, pp. 1-8.
U.S. Appl. No. 13/500,489, filed Apr. 5, 2012; Inventor: Fritjoffsson et al.
Office Action mailed Jun. 28, 2013 in U.S. Appl. No. 13/500,489.
K.J. Åström et al., "Computer Controlled Systems, Theory and Design", 3rd Ed, Prentice Hall, 1997.
J. Maciejowski, Multivariable Feedback Design, Addison-Wesley 1989.

* cited by examiner

TEST PRESSURISATION DEVICE FOR HOSE

This application is the U.S. national phase of International Application No. PCT/SE2010/051410, filed 17 Dec. 2010, which designated the U.S. and claims priority to SE Application No. 1050003-1, filed 7 Jan. 2010, the entire contents of each of which are hereby incorporated by reference.

TECHNICAL FIELD

The invention concerns a test pressurisation device for hose and a system for test pressurisation including such a test pressurisation device.

BACKGROUND

Hoses, like for example fire hoses, are usually inspected after usage to, among other things, control the tightness of the hose. This is normally done by connecting one end of the hose to a so-called air valve and the other end to a liquid pump (usually a water pump) that can fill the hose with pressurised fluid (e.g. water). The air inside the hose can then abscond through the air valve which let air and gas through but not water.

Usually the hose is wound-up in a screw line form on a drum with a preferably vertically oriented axis so that the winding-up can take place within a relatively small space. The whole wound-up hose is filled with pressurised fluid, and thereafter the liquid filled hose can be inspected.

The hose can burst during pressurisation, at which the operator risks being injured during visual inspection. As the liquid pressure can be very high, the operator can be injured by leaking jets. It is well known to encapsulate the pressurised winding of the hose with a screen or similar protection device which protects the operator at inspection of the hose.

The European patent EP 0677 728 shows, for example, a solution where a transparent protective screen fully encapsulates the drum on which the hose is wound-up to ease visual inspection while providing a certain protection. The screen is further provided with openable hatches which make it possible for the operator to get to the pressurised hose through the screen, to for example, mark possible holes in the hose so that a later repairing can take place. In this known case, the drum is held still under pressurisation due to the other end of the hose being connected to a stationary water supply connection. Thus the operator must move around the drum during visual inspection.

In other known cases, like for example in the Swedish patent SE 528 582, the pressurised, and on the drum wound-up hose, is connected to the water pump via a pipe swivel connection that allows a free rotation of the drum while the hose is maintained pressurised. In that manner, the operator can remain in a fixed operator position at the visual inspection, and the protective barrier between the operator and the drum can have a lesser extent in the drums circumference direction. According to the Swedish patent SE 528 582, the protective barrier can with benefit be designed like a removable screen that can be removed if needed or set in an optional position relative to the construction.

SUMMARY

The prevalent convention according to the technology's standing point assumes the use of a drum for winding up hose in conjunction with test pressurisation of hose as one regards this to be the least space requiring solution.

The inventor has however realised that there are possibilities for even more space efficient solutions in relation to test pressurisation of hose.

According to the invention a test pressurisation device is provided that is adapted for receiving hose, and that includes a first pair of press/driving rolls between which the hose can be inserted, and another pair of press/driving rolls between which the hose can be inserted, where the first pair of press rolls is arranged at a distance from the second pair of press rolls. Furthermore, each pair of press rolls is arranged for pressing together the hose between the rolls in conjunction with pressurisation so that a limited part of the hose, which is located between the first and the second pair of press rolls, can be held pressurised and control of the tightness of the hose can be admitted. The test pressurisation device further includes a motorised mechanism for feeding of the hose through the pairs of press rolls in conjunction with pressurisation of the hose to admit that different parts of the hose successively are held under pressure, where at least one of the pairs of press rolls is/are configured to operate as driving rolls for feeding of the hose. The test pressurisation device also includes means for adjusting and/or maintaining a prescribed test pressure of the part of the hose which is located between the first pair of press/driving rolls and the second pair of press/driving rolls.

Further, the press rolls may be designed so that they are motor driven, thus allowing for feeding the hose through the system. This process eliminates the need for a separate feeding device such as pulling the hose through the system, thus reducing the wearing of the hose.

In this manner, a very space efficient solution can be achieved, as only a limited part of the hose needs to be pressurised at a time.

Preferably the test pressurisation device includes a mechanism for feeding the hose through the pairs of press rolls to admit that different sections of the hose successively are held under pressure so that the whole hose can be inspected if desired. The feeding mechanism is preferably constituted by the press/driving rolls where they will automatically feed the hose at a suitable speed through the system while maintaining the appropriate pressure.

Further advantages and characteristics that are offered by the invention will be clear by reading through the following description of the inventions design forms.

BRIEF DESCRIPTION OF DRAWINGS

The invention, together with further purposes and advantages, will be exemplified with referrals to the enclosed drawings, in which.

DESCRIPTION OF EXEMPLIFIED DESIGN FORMS

The invention is described through illustrative examples that illustrate the fundamental principles.

Figure 1:
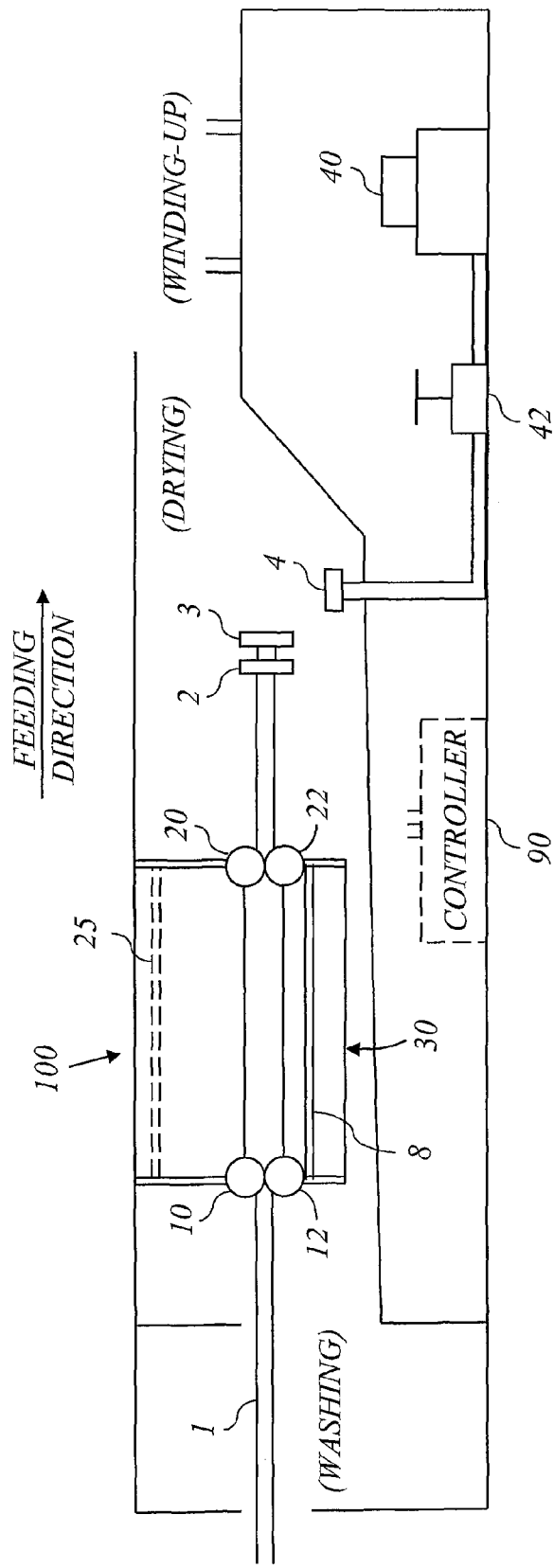
FIG. 1 is a schematic diagram that shows an example of a test pressurisation device for hose according to a first illustrative design.

FIG. 1 is a schematic diagram that shows an example of a test pressurisation device for hose according to a first illustrative design. The test pressurisation device itself can possibly be arranged in association with a hose washing unit, and subsequent drying and/or winding-up of the hose and possibly other pertinent function units. The following description focuses however on the test pressurisation device.

Generally, the test pressurisation device 100 is adapted for reception of hose like e.g. fire hose. The device is normally also adapted for bearing of the hose in both pressurised and non-pressurised condition. The test pressurisation device mainly includes a first pair of press rolls 10, 12 between which the hose can be inserted, where the first pair of press rolls 10, 12 is arranged on a distance from the second pair of press rolls 20, 22. Further, each pair of press rolls is arranged for pressing or squeezing the hose between the rolls in conjunction with pressurisation so that a limited part of the hose, which is located between the first and the second pair of press rolls, can be kept pressurised and control of the hose's tightness is admitted. The test pressurisation device further includes a motorised mechanism for feeding of the hose through the pairs of press rolls in conjunction with pressurisation of the hose to admit that different parts of the hose successively are held under pressure, where at least one of the pairs of press rolls are configured to operate as driving rolls for feeding of the hose. The test pressurisation device also includes means for adjusting and/or maintaining a prescribed test pressure of the part of the hose which is located between the first pair of press/driving rolls and the second pair of press/driving rolls.

The rolls may also be referred to as rollers, and the pairs of rolls may thus also be called roller pairs.

The international patent application WO 2008/110150 also relates to a compact testing device for a fire hose. However, this testing device has a separate drive device, located outside of the testing device, that pulls the hose through the system, with possible wearing of the hose and limited ability to control the test pressure.

Preferably, the press/driving rolls of the present invention are designed so that they are motor driven, thus allowing for feeding the hose through the system. This process eliminates the need for a separate feeding device such as pulling the hose through the system, thus reducing the wearing of the hose.

While sections of the hose are held pressurised between the pairs of press/driving rolls, the same pairs of press/driving rolls are preferably feeding the hose forward, thus checking the hose's tightness in a continuously moving section approach.

In this manner, a very space efficient solution can be obtained, as only a limited part of the hose needs to be pressurised at a time. In addition, the prescribed test pressure can be effectively maintained or adjusted if and when required during testing.

Preferably, the test pressurisation device includes a mechanism for feeding the hose through the pairs of press rolls to admit different parts of the hose to successively be held under pressure so that the entire hose can be inspected if so desired. As mentioned, one of the pairs of press rolls, or both pairs of press rolls, can be arranged to also operate as drive/driving rolls for feeding of the hose. By adjusting the speed of the rollers individually or collectively, the maneuvering of the hose can be completely flexible. In particular the pressure of the selected section of the hose, which is in between the two pairs of press/driving rollers 10, 12 and 20, 22, can be kept constant even if a leak due to a hole or another damage of the hose should appear. It has been shown possible to at least double the speed (meter of hose per time unit) for controlling of the hose with this new test pressurisation device compared to conventional test pressurisation systems. This provides considerable savings in working time.

As mentioned, the test pressurisation device can, if desirable, be arranged together with a mechanism 25 for adjusting and/or maintaining the prescribed test pressure, e.g. by means of adjustment of the distance between the first pair of press/driving rolls and the second pair of press/driving rolls.

The test system may also include an optional sled 8 for reasons as will be explained below. For example, the first pair of press/driving rolls is motorised and mounted on the sled 8 where one or both of the rolls are driving the hose forward or stopping the driving, and the second pair of press/driving rolls is also motorized, but mounted in a fixed position, where one or both of the rolls are driving the hose forward at constant/maximum or variable speed.

Both pairs of the motorised press/driving rolls may be controlled by one or two Single-Input-Single-Output (SISO) or Multiple-Input-Multiple-Output (MIMO) regulators that is/are configured to admit adjustment and/or maintaining of the prescribed test pressure. The regulator(s) may be arranged in an overall controller (90) of the test pressurisation device/system.

For more information on SISO and MIMO regulators in general, reference can, for example, be made to Åström and Wittenmark (1997), Maciejovski J. (1989)

By way of example, in the event of a leak, as a result of a hole or another damage of the hose, the adjustment of the pressure may be accomplished by the second pair of press/driving rolls 20, 22 being driven at constant or maximum speed whereas the first pair of press/driving rolls, 10, 12, which is mounted on the sled 8, is breaking so that the second pair of press/driving 20, 22 rolls is dragging the sled 8 with the first pair of press/driving rolls 10, 12 closer, thus adjusting the distance between the two pairs of press/driving rolls and thereby retaining the prescribed pressure of the hose.

Alternatively, the adjustment of the pressure may be accomplished by the second pair of press/driving rolls 20, 22 increasing their speed whereas the first pair of press/driving rolls 10, 12, mounted on the sled 8, are breaking. In this way, the temporary decrease in pressure caused by the leak is regulated away/compensated for expeditiously by the fact that the first pair of press/driving rolls 10, 12, mounted on the sled 8, are faster moved closer to the second pair of press/driving rolls 20, 22 by the second pair of press/driving rolls increasing/maintaining their speed and thereby adjusting/retaining the prescribed pressure of the hose.

The mechanism/means for adjusting and/or maintaining a prescribed test pressure of the part of the hose which is located between the first pair of press/driving rolls 10, 12 and the second pair of press/driving rolls 20, 22 may be configured to operate based on measurements of:
- the distance between the two pair of press/driving rolls,
- the torque of either of the two pair of press/driving rolls, or
- the current or voltage of the driving motors of the press/driving rolls to regulate away/compensate for any deviation from the prescribed pressure by the use of either SISO or MIMO controllers for the driving motors of the press/driving rolls.

Advantages of using SISO or MIMO controllers for the driving motors of the press/driving rolls may, depending on the particular circumstances, include one or more of the following:

First, the pressure of the hose located in between the pairs of press/driving rolls 10, 12 and 20, 22 can be accurately maintained at a prescribed level.

Second, if the controllers are designed properly, when a leak, caused by a hole or another damage of the hose occurs, then the controllers, SISO or MIMO depending on what controller structure is preferred, will adjust the speed of the press/driving rolls of the pairs 10, 12 and 20, 22 so that a decrease in the pressure of the hose located between the pairs of press/driving rolls, caused by a leak, will be eliminated immediately. This also means that a hole or other damage resulting in a leak may be detected by detecting a decrease in pressure.

Third, by the use of properly designed high gain controller loops a leak can be compensated for immediately, thus enabling compensation of multiple leaks.

Forth, by the use of one pair of press/driving rolls, here 10, 12, mounted on a sled an easy way to build up pressure in the hose section to be tested can be accomplished, and furthermore, the flexibility to use both SISO and MIMO controllers can be obtained.

In a preferred illustrative design the test pressurisation device shows protective cut-off areas, which are arranged to confine the space between the first and the second pair of press rolls where the pressurised hose is under test pressurisation. It is well known that the hose can rift or burst under pressurisation. Preferably the protective cut-off areas form, according to an illustrative example, an essentially closed system 30 which offers the operator a full protection when the hose is set under pressure. In the light of the high pressures that are often used at test pressurisation of e.g. fire hose, this can be a requirement from an operator view.

It is possible to use the test pressurisation device according to the invention together with a, by the operator, manually performed inspection of the hose. If it is the case of a normal visual inspection, one usually uses one or more transparent cut-off areas, e.g. some form of reinforced protective glass, which enables for such a visual inspection. Preferably however, automatic detection is used for damages on the hose and/or marking of the damages, which will be described later with reference to some illustrative examples.

The test pressurisation device 100 is normally intended for usage together with a fluid pump/water pump 40, or a corresponding pressure water source, here schematically illustrated with an associated closing valve 42, which via a suitable connection 4 can be connected to the hose. In general a fluid connection is used which can be connected to a corresponding connection 2, 3 at one end of the hose. Preferably the hose connection 2, 3 shows a built in closing valve.

The device for inspection of the hose can then be part of an overall test pressurisation system for both hose washing and test pressurisation. The system can in principle be controlled manually by the operator via different mechanical controlling principles, but usually a computerised control system is used for controlling different functions like pressurisation, motorised hose feeding, and possibly automated detection of holes in the hose and/or marking of such holes, and possible other optional functions that can be offered.

In the example shown in FIG. 1 the hose is preferably washed but not pressurised before the test pressurisation device (in the feeding direction), pressurised only in the test pressurisation device, and not pressurised after the test pressurisation device. After the test pressurisation device the hose is preferably washed and pressurised, possibly marked regarding holes and other damages, and ready for drying and subsequent coiling.

Figure 2A:
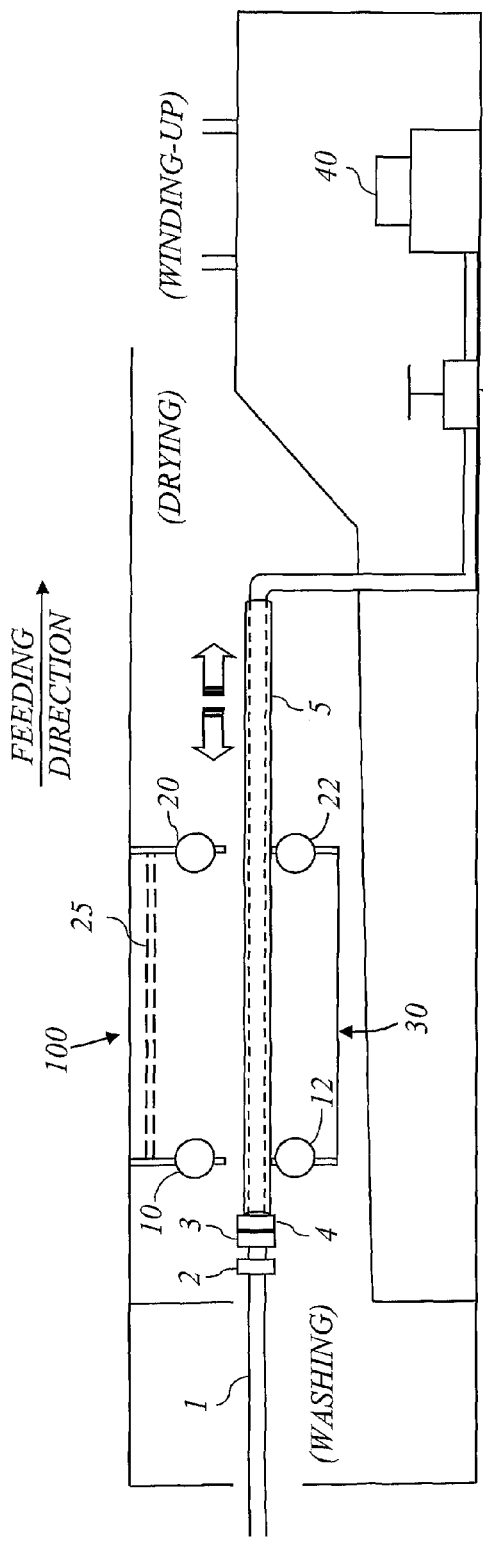
FIG. 2A is a schematic diagram that shows and example of a test pressurisation device for hose equipped with a feeding device for fetching the hose at the intake of the test pressurisation device.

The pairs of press rolls 10, 12, 20, 22 can be maneuvered in relation to each other so that the hose admits to be inserted between the press rolls, as illustrated in FIG. 2A.

FIG. 2A also shows an example of a movable, and preferably flexible and/or telescopic feeding device 5 for fetching of the hose at the intake to the washing section or the intake to the test pressurisation device itself after the hose has been washed. Alternatively one can handle fetching of the hose manually. The connection of the hose itself is normally done manually by the operator with a simple operation, but one can also imagine automatic connection if desired.

The feeding device 5 can preferably transport a movable connection 4 and relating hose, which is connected to a source with suitable medium, for connection with the hose coupling 2, 3 and then transport the hose between the press rolls so that the press rolls thereafter can press the hose together and maintain a medium, like a fluid or even a suitable gas, which has been filled in the hose.

This means that the press rolls in a pair of opposite press rolls are movable/adjustable (horizontally/vertically) in relation to each other.

When filling of a medium like e.g. water or possibly gas in the hose, preferably the first pair of press rolls 10, 12 is arranged to squeeze the hose together while the second pair of press rolls 20, 22 which is closest to the end of the hose where the medium is inserted, is arranged to not press the hose together so that filling and possibly test pressurisation of the hose coupling will be admitted. When the filling is finished the second pair of press rolls 20, 22 are arranged to press the hose together to admit maintaining of the pressurisation of the limited part of the hose that is located between the first and the second pair of press rolls. When the hose is squeezed together by the second pair of press rolls 20, 22 the principle admits drying on the inside of the hose as no water is allowed from the pressurised zone through the second pair of press rolls 20, 22 when they are in a closed-together position.

Figure 2B:
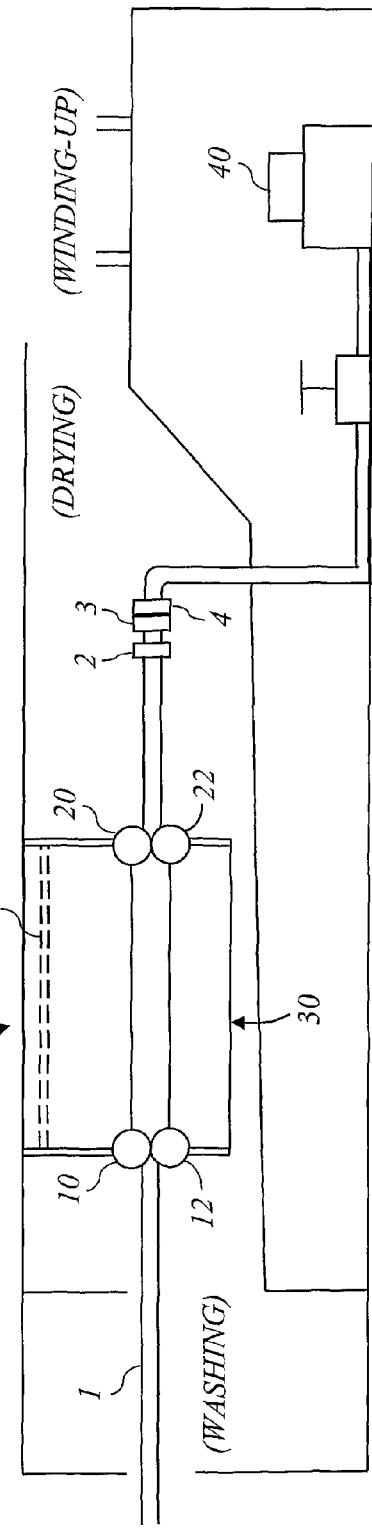
FIG. 2B is a schematic diagram that shows an example of what it can look like when the hose has been brought through the press rolls and has been connected to a fluid source for test pressurisation.

FIG. 2B is a schematic diagram that shows an example of what it can look like when the hose has been brought through the press rolls and has been connected to a fluid source for test pressurisation.

When filling the hose with e.g. water, the air can abscond through the air valve which lets through air and gas but not water if one arranges the hose with an angle to the horizontal plane so that air/gas can rise upwards and backwards towards the air valve. If the medium for test pressurisation consists of a gas, the air valve is not used.

Under the test pressurisation the hose can thus be inspected either manually or mechanically via different types of sensors, which will be described in more detail later. When a hole or other damage in the hose is detected, the hole can be marked so that subsequent reparation can be done. According to known technology this is done by the operator via openable hatches, but this implies a great risk for serious accidents if the hose should burst because of the high pressure.

Figure 3:
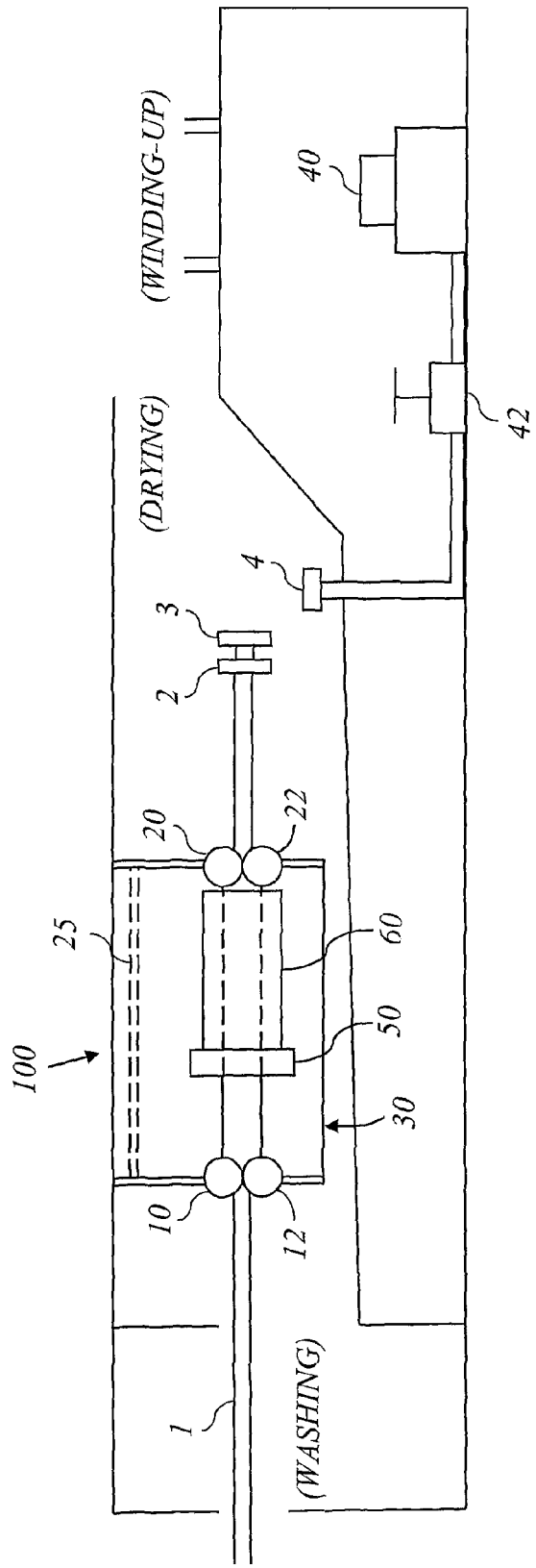
FIG. 3 is a schematic diagram that shows an example of a test pressurisation device for hose according to a second illustrative design.

According to a design example that is illustrated in FIG. 3 the test pressurisation device 100 includes a mechanism 50 for detection of holes and/or other damages on the part of the hose which is currently pressurised. Alternatively a mechanism 60 for marking of holes and/or other damages on the hose can be arranged in conjunction to the test pressurisation device if one wants to avoid manual marking.

This can, for example, admit marking with high precision, and/or be included in a fully automated solution for detection and/or marking of holes.

The detection mechanism 50, which can be placed in different ways in conjunction to the pressurised hose, is arranged for automatic detection of holes and/or other damages based on e.g. visual indications (e.g. camera), pressure changes (e.g. pressure sensor) and/or sound changes (e.g. microphone). One can thus use e.g. a camera unit or similar which together with a data processing unit admits visual detection of squirting water/fluid caused by leakage in the hose (alternatively detection of leaking gas in to fluid. Alternatively one can use a pressure sensor or a similar unit that senses a pressure change in the hose at leakage or the jet that occurs from leakage due to a hole or other damage on the hose. Another variant is thus to use a microphone that together with a connected data processing unit records and detects the sound that occurs in relation to water or fluid (or possibly gas if used) leaking out.

One can also detect holes by measuring motor characteristics such as current, voltage or torque at the motors that drives the rolls. If e.g. water leaks out due to a hole, there will be a change in the current, voltage or torque, which can be detected. Such a change can preferably be compensated by a regulator. Through logging of current, voltage or torque, also the hole's position can be computed and marked after a time period of continued feeding of the hose calculated from the detection of a change as one knows the speed of the hose.

One can imagine variants where one uses thread of e.g. metal which is formed and arranged in a suitable way around the hose to detect a leaking jet. A detection device can then detect e.g. vibrations that occur in the thread, or if the thread is electrified, alternatively a current- or voltage change can be detected when the thread is hit by the jet. This can be effective to detect even small holes with high certainty. In the same manner as described above, multiple holes are allowed to be detected, in case of processing a hose with more than one hole and/or other damage, and subsequently marked.

The mechanism 60 for marking can for example be constituted by an ink jet writing unit or be realised through other conventional marking or labelling techniques.

A mechanism for marking of holes and/or other damages can be maneuvered automatically or manually by the operator.

In the first mentioned case maneuvering of the marking mechanism can for example be done through the use of computer control. A suitable user interface admits the operator control over this control action. If a fully automated system for detection and marking of holes is desired, then the computer control algorithm will preferably use input data from the detection mechanism so that marking can be done in conjunction to a detected hole.

In the latter case the maneuvering is preferably done in such way that at least some protective cut-off area always protects the operator under pressurisation. At manual marking a control stick or similar can be provided to enable for the operator to control the marking device from the outside.

According to the design example shown in FIG. 3 the marking device 60 is built in to the test pressurisation device inside of the protective cut-off areas. Alternatively the marking device 60 can be arranged outside of the protective cut-off areas as shown in the design example according to FIG. 4.

Figure 4:
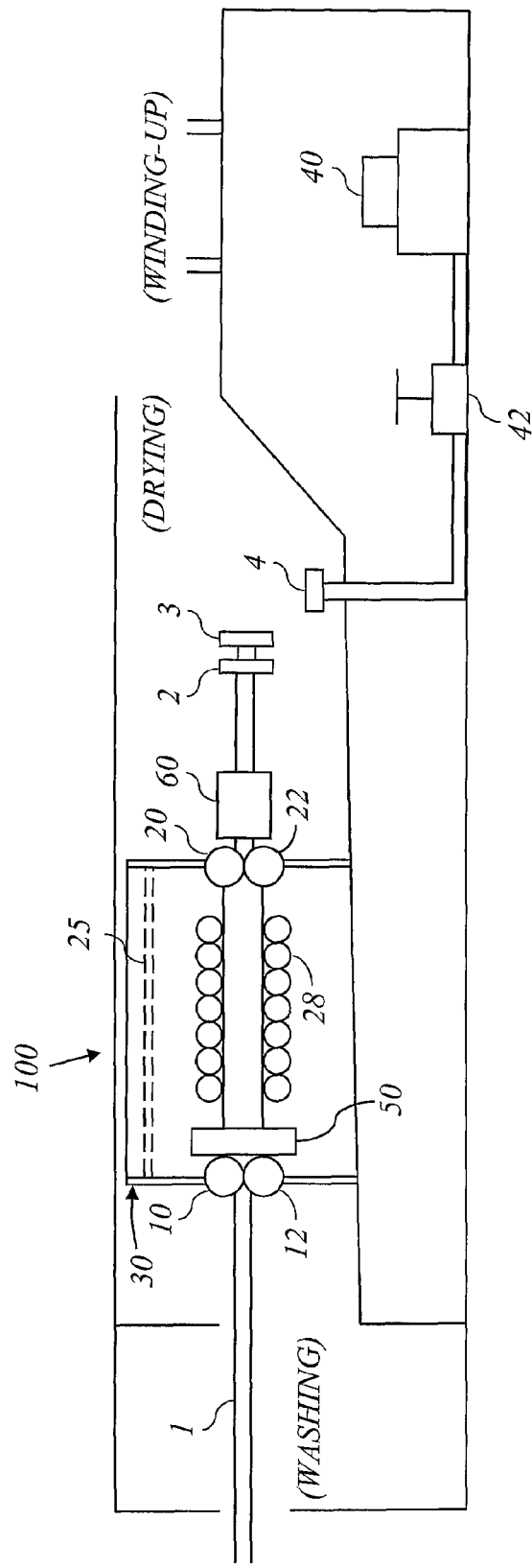
FIG. 4 is a schematic diagram that shows an example of a test pressurisation device for hose according to a third illustrative design.

In the design according to FIG. 4 the detection device 50 can, for example, be arranged for detection in connection to the feeding of a new part of the hose between the first and the second pair of press rolls based on a change in hose pressure. In this case the marking device 60 can for example be arranged for marking of the hose after a time period T of continuous feeding of hose calculated from detection of a change of the hose pressure. The time period T can then be calculated from the feeding speed V and the distance S from the first pair of press rolls to the marking mechanism (T=S/V) so that the hose is marked close to the hole and/or damage. In the same manner, multiple holes are allowed to be detected and subsequently marked as e.g. the controller operating on the first pair of press rolls 10, 12 will detect a change in pressure of the pressurised section of the hose, and immediately compensate for that pressure change. Thus, multiple changes in pressure, indicating multiple holes, are allowed to be detected.

In FIG. 4 an example is also shown of a possible complementing mechanism 28, which is intended to support the maintaining of the prescribed test pressure. This mechanism preferably includes a number of press rolls, which is arranged to apply a certain pressure against the hose (normally significantly lower pressure than that applied by the press rolls 10, 12 and 20, 22 which presses the hose together) to help maintaining the necessary hose pressure. The pressure from the press rolls in the mechanism 28 is not so large that the hose is pressed together completely.

Figure 5:
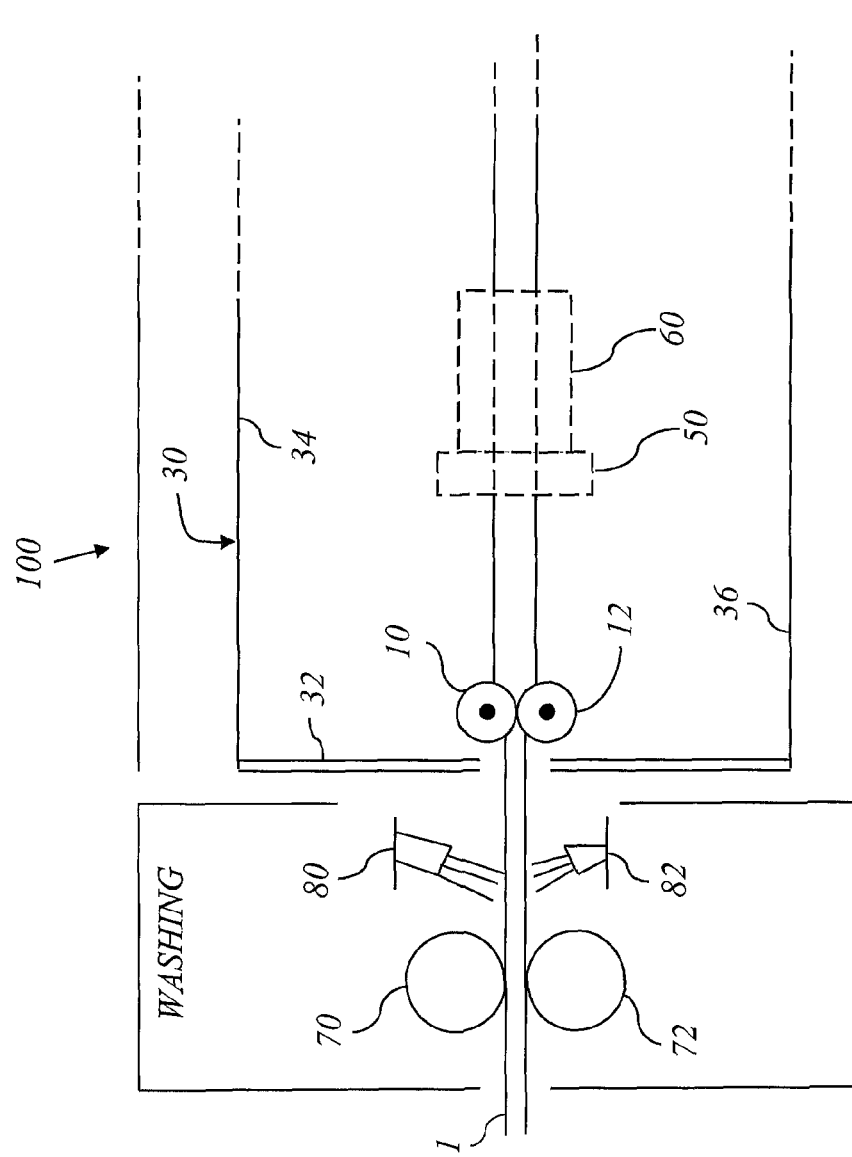
FIG. 5 shows a selected part of an example of a test pressurisation device arranged in connection to a simple variant of a hose washing unit.

FIG. 5 shows a selection of an example of a test pressurisation device arranged in connection with a simple variant of a hose washing unit. In this example the hose washing unit shows two parts, a first part based on hose wash with brushes 70, 72 on both sides of the input hose and a second part based on pressure wash (low or high pressure washing) with washing nozzles 80, 82. The test pressurisation device 100 is arranged after the hose wash, and protective cut-off areas 32, 34, 36 form a more or less encapsulated system which delimits the pressurised part from the surrounding areas. In FIG. 5 only the first pair of press rolls 10, 12 is shown, but an expert in the field realises that also a second pair of press rolls is needed to hold a limited part of the hose pressurised. Possibly a mechanism 50 for detection and/or a mechanism 60 for marking of holes can be arranged inside of the protective walls. As mentioned before the mechanism 60 for marking can also be arranged outside of the protective walls.

Figure 6:
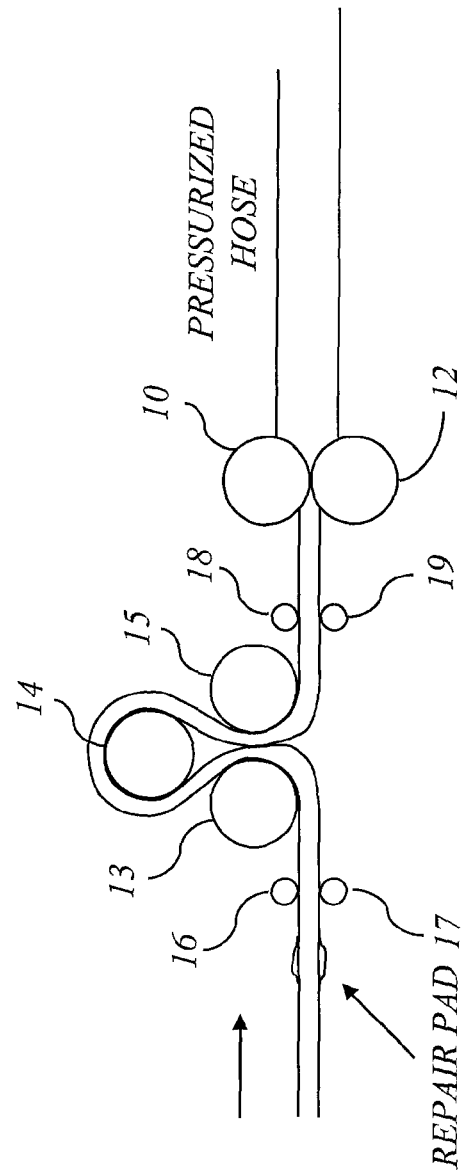
FIG. 6 shows an example of how a further pair of press rolls and/or so-called level rolls can be used for different purposes in a test pressurisation device according to one design.

FIG. 6 shows an example of how additional press rolls and/or so called level rolls can be used for different purposes in a test pressurisation device according to a design. For example two or more additional press rolls 13, 14, 15, can be arranged before the press rolls 10, 12 in the feeding direction to help holding the hose stretched and to prevent the hose to "crawl into" the pressurised part of the test pressurisation device. Preferably these additional press rolls are run with essentially the same speed as the press rolls 10, 12. One can also imagine to use one or more pairs of so called level rolls 16, 17 and/or 18, 19 which are adjusted to be able to detect old repairing pads on the hose as humps, and thereafter the pressure used by e.g. the press rolls 10, 12 can be adjusted so that the hose can, without problem, be fed through these press rolls. This can be adjusted so that the pressure on the rolls temporary reduces somewhat in relation to a repairing pad/hump, without causing any significant leakage of fluid from the pressurised part.

Figure 7:
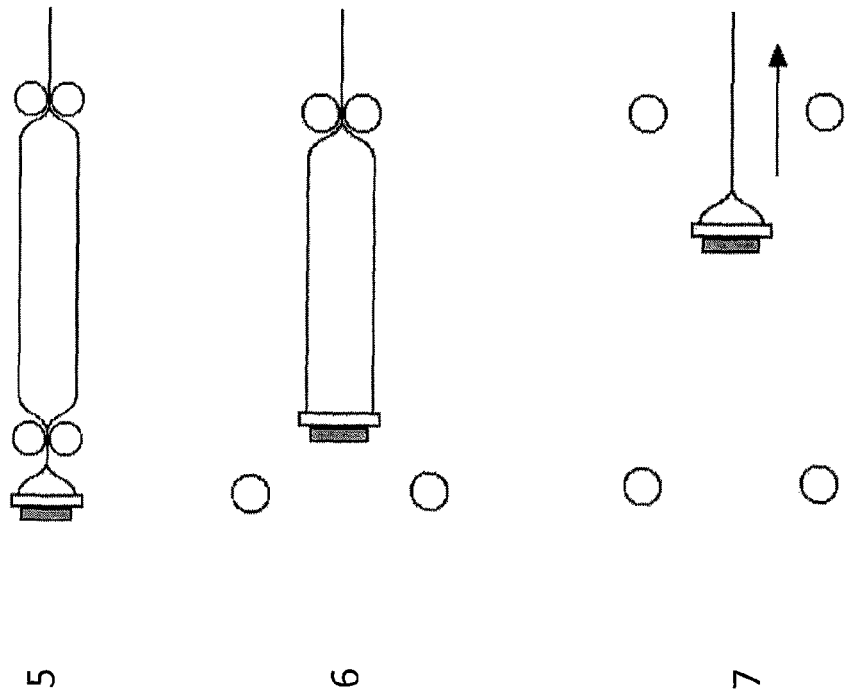
FIG. 7 is a schematic diagram that shows an illustrative example of the different steps in the process of a hose being fed through the test pressurisation device.
Figure 7:
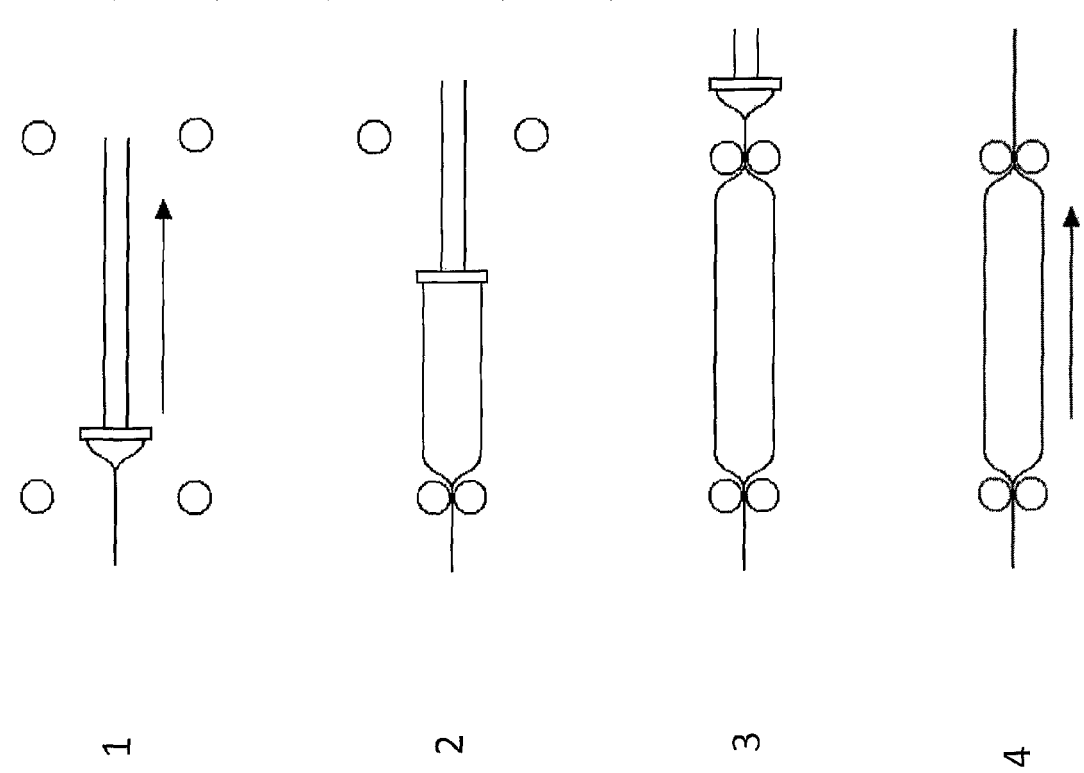

FIG. 7 describes an illustrative example of the different phases, labelled 1-7, of the hose being fed through the pressurisation zone.

In Phase 1 both of the press/driving roller pairs are open and enables the fetching unit to feed the hose into the pressurising zone between the roller pairs.

In Phase 2 the press/driving roller pair 10, 12 is closing and pressing the hose together whereas fluid, such as e.g. water is filled via a valve on the fetching unit. The press/driving rollers 10, 12 are now building up the pressure in the hose so that the prescribed pressure is attained. The house coupling and the first part of the hose is now inspected for leaks. If leaks are detected these may subsequently be marked by the device 60.

In Phase 3 the hose fetching unit is feeding the hose coupling through the second press/driving rolls 20, 22, which are then closed so that the hose is pressed together and the press/driving rolls are adjusted so that the part of the hose located between the pairs of press/driving rolls is pressurised with the prescribed test pressure.

In Phase 4 the hose is now continuously fed through the pressurised zone so that the whole hose is inspected. If a leak occurs, caused by a hole or other damage of the hose, then the controller(s) operating on the press/driving rolls will act immediately and compensate for the decrease in pressure that will result. As described previously, the hole(s) are detected and subsequently marked by the marking device 60. This process will continue until the end of the hose is reached, i.e., when the first pair of press/driving rolls 10, 12 encounters the coupling with the air valve at the end of the hose.

The detection of the coupling with the air valve is carried out in Phase 5 and the feeding of the hose stops.

When Phase 5 is completed, the pair of press/driving rolls 10, 12 open up and Phase 6 is entered, where remaining air is let out through the air valve which the closes and the pressure is again adjusted to the prescribed pressure so that the end of the hose and its coupling can be tested.

Finally, when Phase 6 is completed Phase 7 starts where the second pair of press/driving rolls 20, 22 open and let the hose out for subsequent marking and wound-up.

The above described designs are only examples and the invention is not limited to these. Additional modifications, changes and improvements that builds on the fundamental principles that are shown here lies within the scope of the invention.

REFERENCES

Åström K. J. and Wittenmark B.,
"Computer Controlled Systems, Theory and Design",
3$^{rd}$ Ed, Prentice Hall, 1997.
Maciejovski J.,
"Multivariable Feedback Design",
Addison-Wesley 1989.

The invention claimed is:

1. A test pressurisation device adapted for reception of hose, the test pressurisation device comprising:
   a first pair of press rolls between which the hose can be inserted, and
   a second pair of press rolls between which the hose can be inserted,
   wherein the first pair of press rolls is arranged at a distance from the second pair of press rolls, and
   each pair of press rolls is arranged for pressing the hose together between the rolls in conjunction with pressurisation of the hose so that a limited part of the hose located between the first and the second pair of press rolls can be held pressurised,
   wherein the test pressurisation device further comprises:
   a motorised mechanism arranged to feed the hose through the pairs of press rolls in conjunction with pressurisation of the hose to allow different parts of the hose between the first and the second pair of press rolls to be successively held under pressure,
   wherein at least one of the pairs of press rolls is configured to operate as driving rolls for feeding of the hose at a suitable speed while adjusting and/or maintaining a prescribed test pressure of the limited part of the hose currently located between the first pair of press rolls and the second pair of press rolls,
   wherein the pair of press rolls is motorised and mounted on a sled where one or both of the pair of press/driving rolls is arranged to controllably drive the hose forward or not, and
   wherein the other pair of press rolls is motorised and mounted in a fixed position, where one or both of the other pair of press rolls is arranged to drive the hose forward at a constant or variable speed.

2. A test pressurisation device according to claim 1, wherein protective cut-off areas are arranged to confine the space between and around the first and the second pair of press rolls where the limited part of the hose is located pressurisation.

3. A test pressurisation device according to claim 2, wherein the protective cut-off areas form an encapsulated system.

4. A test pressurisation device according to claim 1, wherein one of the pairs of press rolls is arranged to, when inserting a medium into the hose, press the hose together while the other pair of press rolls, which is closest to the end where the medium is inserted, is arranged to, in that position, not press the hose together to permit filling and testing of a hose coupling,
   wherein the other pair of press rolls is arranged to, when the inserting is finished, also press the hose together to maintain pressurisation of the limited part of the hose that is located between the first and the second pair of press rolls.

5. A test pressurisation device according to claim 1, wherein the motorised press rolls are controlled by one or two Single-Input-Single-Output (SISO) or Multiple-Input-Multiple-Output (MIMO) regulators configured to allow adjustment and/or maintaining of the prescribed test pressure.

6. A test pressurisation device according to claim 1, wherein the driving motors of the motorised press rolls are controlled by Single-Input-Single-Output (SISO) or Multiple-Input-Multiple-Output (MIMO) controllers, which are configured to operate based on measurements of the distance between the two pair of press rolls, or the torque of either of the two pair of press/driving rolls, or the current or voltage of the driving motors of the press rolls to compensate for any deviation from the prescribed pressure.

7. A test pressurisation device according to claim 1, wherein the test pressurisation device includes a mechanism for detection of holes and/or other damages on the part of the hose that is currently pressurised.

8. A test pressurisation device according to claim 7, wherein the detection mechanism is arranged for automatic detection of holes and/or other damages based on visual indications, and/or detection of vibrations, pressure changes, sound changes, and/or change in motor properties of the driving motors of the press rolls.

9. A test pressurisation device according to claim 1, wherein the test pressurisation device includes a mechanism for marking of holes and/or other damages on the hose.

10. A test pressurisation device according to claim 9, wherein the protective cut-off areas are arranged to delimit the space between and around the first and the second pair of press rolls where the limited part of the hose is located at pressurisation, and the marking mechanism is arranged inside of the protective cut-off areas.

11. A test pressurisation device according to claim 9, wherein the protective cut-off areas are arranged to delimit the space between and around the first and the second pair of press rolls where the limited part of the hose is located at pressurisation, and the marking mechanism is arranged outside of the protective cut-off areas.

12. A test pressurisation device according to claim 11, wherein the test pressurisation device includes:
 a mechanism for detection, in conjunction with feeding of a new part of the hose between the first and the second pair of press rolls, of holes and/or other damage to the hose or couplings associated with the hose based on a change in hose pressure,
 where the marking mechanism which is placed in a given position outside of the protective cut-off areas is arranged for marking of the hose after a time period of feeding of hose calculated from a feeding speed and a distance from the first pair of press rolls and the marking device so that the hose is marked close to the hole and/or damage.

13. A test pressurisation device according to claim 1, wherein the device is adapted for a fire hose.

14. A test pressurisation device according to claim 1, wherein the second pair of press rolls is configured to press the hose together so that fluid inside the hose is moved backwards towards the end of the hose to permit drying on the inside of the hose.

15. A system for test pressurisation of a hose including the test pressurisation device according to claim 1.

16. A test pressurisation device adapted for reception of a hose, wherein the test pressurisation device includes:
 a first pair of press rolls between which the hose can be inserted, wherein the first pair of press rolls is mounted on a sled, and
 a second pair of press rolls between which the hose can be inserted,
 wherein the first pair of press rolls is arranged at a distance from the second pair of press rolls, and
 each pair of press rolls is arranged for pressing the hose together between the rolls in conjunction with pressurisation of the hose so that a limited part of the hose located between the first and the second pair of press rolls can be held pressurised,
 wherein the test pressurisation device further comprises a motorised mechanism arranged to feed the hose through the pairs of press rolls in conjunction with pressurisation of the hose to allow different parts of the hose to be successively held under pressure between the first and the second pair of press rolls,
 wherein at least one of the pairs of press rolls is configured to operate as a pair of driving rolls for feeding of the hose at a desired speed while adjusting and/or maintaining a prescribed test pressure of the part of the hose located between the first pair of press rolls and the second pair of press rolls,
 wherein, in the event of a leak, the test pressure is adjustable by the second pair of press rolls being driven at constant or maximum speed whereas the first pair of press rolls is braking so that the second pair of press rolls pulls the sled with the first pair of press rolls to reduce the distance between the two pairs of press rolls and thereby retaining the prescribed test pressure of the hose.

17. A test pressurisation device adapted for reception of a hose, wherein the test pressurisation device includes:
 a first pair of press rolls between which the hose can be inserted, wherein the first pair of press rolls is mounted on a sled, and
 a second pair of press rolls between which the hose can be inserted,
 wherein the first pair of press rolls is arranged at a distance from the second pair of press rolls, and
 each pair of press rolls is arranged for pressing the hose together between the rolls in conjunction with pressurisation of the hose so that a limited part of the hose located between the first and the second pair of press rolls can be held pressurised,
 wherein the test pressurisation device further comprises a motorised mechanism arranged to feed the hose through the pairs of press rolls in conjunction with pressurisation of the hose to allow different parts of the hose to be successively held under pressure between the first and the second pair of press rolls,
 wherein at least one of the pairs of press rolls is configured to operate as a pair of driving rolls for feeding of the hose at a desired speed while adjusting and/or maintaining a prescribed test pressure of the part of the hose located between the first pair of press rolls and the second pair of press rolls,
 wherein, in the event of a leak, the test pressure is adjustable by increasing a speed of the second pair of press rolls and braking the first pair of press rolls, mounted on the sled, so that the temporary decrease in pressure caused by the leak is compensated for by the fact that the first pair of press rolls, mounted on the sled, is moved closer to the second pair of press rolls by the second pair of press rolls increasing their speed and thereby adjusting/retaining the prescribed pressure of the hose.

18. A test pressurisation device adapted for reception of a hose, wherein the test pressurisation device includes:
 a first pair of press rolls between which the hose can be inserted, and
 a second pair of press rolls between which the hose can be inserted,
 wherein the first pair of press rolls is arranged at a distance from the second pair of press rolls, and
 each pair of press rolls is arranged for pressing the hose together between the rolls in conjunction with pressurisation of the hose so that a limited part of the hose located between the first and the second pair of press rolls can be held pressurised,
 wherein the test pressurisation device further comprises a motorised mechanism arranged to feed the hose through the pairs of press rolls in conjunction with pressurisation of the hose to allow different parts of the hose to be successively held under pressure between the first and the second pair of press rolls,
 wherein at least one of the pairs of press rolls is configured to operate as a pair of driving rolls for feeding of the hose at a desired speed while adjusting and/or maintaining a prescribed test pressure of the part of the hose located between the first pair of press rolls and the second pair of press rolls,
 wherein the first pair of press rolls is motorised and mounted on a sled, wherein the second pair of press rolls is motorised and mounted in a fixed position.

* * * * *